UNITED STATES PATENT OFFICE

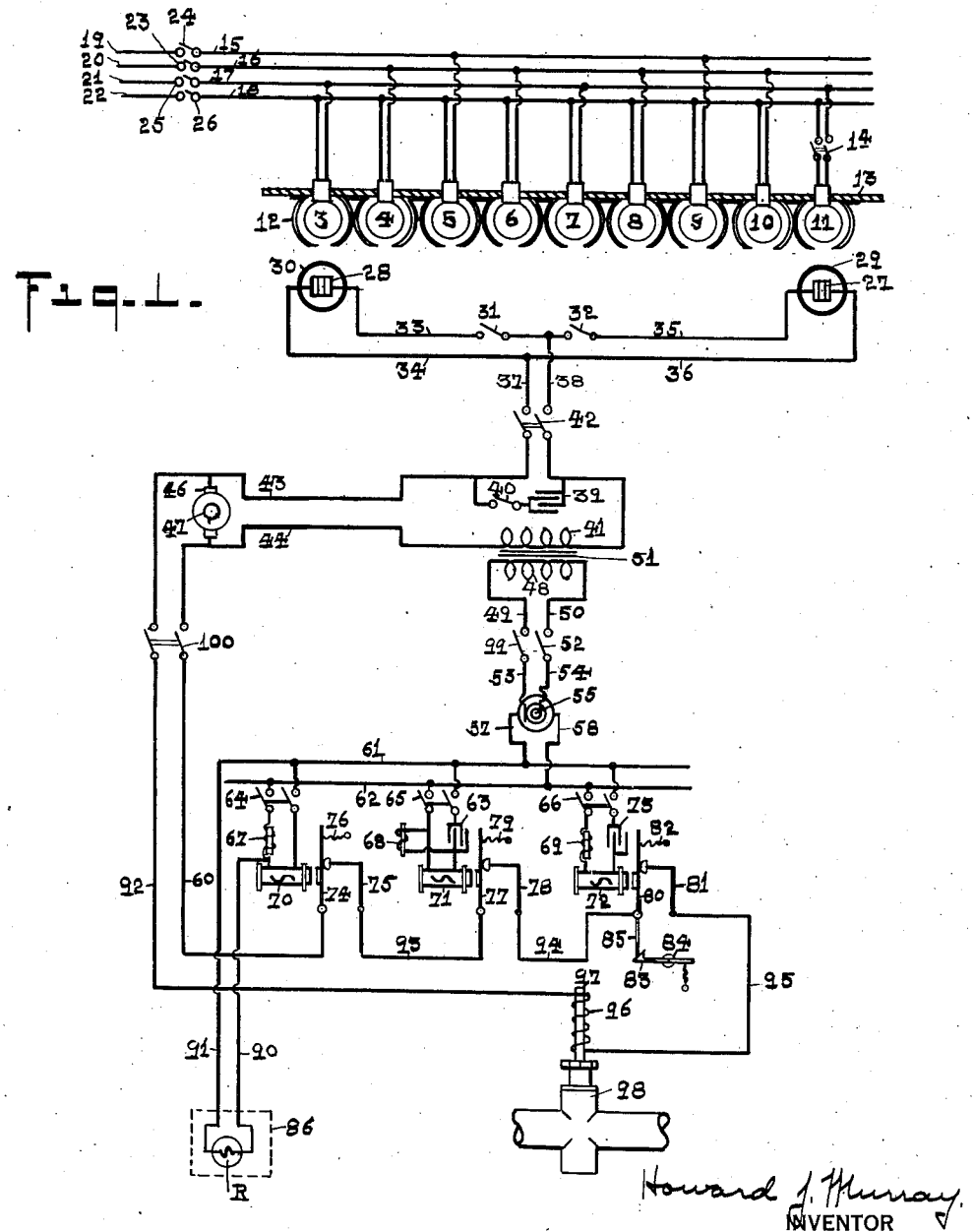

HOWARD J. MURRAY, OF BROOKLYN, NEW YORK

REMOTE LIGHT-CONTROL SYSTEM

Application filed November 16, 1927. Serial No. 233,733.

My invention in general relates to improvements in methods of controlling vehicles by the action of intercepted light on a light affected circuit organization.

According to my invention, a plurality of rays of light are employed in such a manner that the said rays will control a light affected circuit organization according to the rate the said rays are intercepted by the said organization.

One of the objects of my invention is to change the status of a light susceptible circuit organization in approximate synchronism with the interceptions of a plurality of rays of energy whereby an alternating current in effect will be caused to flow in certain portions of the said circuit.

Another object of my invention is to provide means designed to selectively intercept rays of light consecutively at a desired rate so as to cause alternating current to flow in a light susceptible circuit organization with a frequency corresponding to the said rate of consecutive interception.

Still another object of my invention is to provide means designed to be selectively actuated by certain alternating currents resulting from the action of intercepted light on a light susceptible circuit element.

My invention also contemplates the use of a plurality of rays of energy intercepted singly or together at the same or at different rates, and a plurality of light affected circuit elements arranged to affect the same or different circuits.

My invention still further contemplates the remote control of a movable vehicle by the combined action of alternating currents from a plurality of sources. Since two or more sets of beams may be intercepted at different rates at the same time, I am able to remotely combine alternating currents of different frequencies corresponding to different rates of light interception.

In addition my invention contemplates the interception of reflected beams of energy at desired consecutive sequences thereby to remotely convert direct current into alternating currents of desired frequencies.

In order to explain a theory of action which is believed to underlie the principles of my invention, let it first be assumed that means are provided for supplying and desirably positioning a plurality of sources of beams of light. Let it further be assumed that a ray affected circuit organization including a ray affected element is movable relative to the paths of the said beams. Let it also be assumed that the said circuit organization also includes a source of electric current, current amplifying means, portions in which alternating current of a given frequency cannot flow with sufficient strength to operate a certain control element, other portions in which an alternating current with a given frequency can flow to operate a control element, current generating means operatively connected to the movable vehicle, and suitable power control elements.

Now if the said rays are intercepted regularly at a given rate (say 40 times per second) by the said ray affected element, then the resistance of the ray affected circuit organization including the ray affected element will be varied at the same rate. If the varying current is conducted through the primary winding of a transformer it is evident that alternating current in effect will be induced in the secondary winding of the said transformer. This alternating current will have the same frequency as the said rate of interception.

If the rate of interception is changed the frequency of the induced current will accordingly be changed to the same extent. Hence it is possible by means of intercepting rays of energy at a given rate to selectively convert direct current to alternating current of a desired frequency at a remote point. This current may then be amplified in any suitable known manner. The amplification may occur before the conversion to alternating current if it is desired.

According to this invention this induced current is conducted to a plurality of impedance coils and condensers each designed to offer a minimum impedance to a current of a given frequency. Accordingly as the rate of ray interception is increased from a zero rate to a maximum rate, an alternating current will also be induced in the said secondary winding with a corresponding increase of frequency. As the frequency reaches a given predetermined value the current will selectively flow through the impedance coil designed for the given frequency. The invention therefore provides a means of selectively diverting current to a given circuit from a remote point.

If suitable relays are placed operatively in the circuits of these individual impedance coils, it is evident that each of these relays may be selectively actuated by varying the rate of ray interception. Therefore according to my invention, it is possible to selectively actuate at a remote point a plurality of circuit closers or elements in any desired sequence, this selective actuation to be effected by intercepting beams of light at a certain consecutive rate for a given interval.

My invention also contemplates the use of power controlling means operatively associated with the said relays, and arranged to be selectively actuated by the relays to selectively affect the motion of a vehicle.

Various other objects and advantages of my invention will in part be obvious from an inspection of the accompanying drawings and in part will be more fully set forth in the following particular description of one form of mechanism embodying my invention, and the invention also consists in certain new and novel features of construction and combination of parts hereinafter set forth and claimed.

In the drawings:—

Fig. 1 is largely a diagrammatic view of the arrangement of means embodying a preferred form of my invention and the necessary connections to properly complete a working circuit organization.

In the following description and in the claims parts will be identified by specific names for convenience of expression, but they are intended to be as generic in their application to similar parts as the art will permit.

As the invention may be admirably embodied in a remote train control system it will be described in connection with such a device, but it will be obvious that the invention is not so limited, but may be utilized wherever a ray sensitive circuit organization may be moved to selectively intercept a plurality of energy rays in desired consecutive sequence.

In the drawings there are illustrated largely diagrammatically a plurality of sources of radiant energy such as light, altho it is within the scope of this invention that the radiant energy could be of any known form such as heat. These sources are identified as lamps 3 to 11 inclusive, and any number of these lamps could be added for certain desired conditions. These lamps are connected in the conventional manner to a series of feeders 15, 16, 17, and 18 operatively connected with a signal system organization of which leads 19, 20, 21, and 22 are a portion by means of switches 23, 24, 25, and 26. Lamps 3, 7, and 11 are connected to feeders 17 and 18. Lamps 4, 6, 8, and 10 are connected to feeders 16 and 18. Lamps 5 and 9 are connected to feeders 15 and 18. Each lamp is provided with a reflector 12 designed to concentrate the light in the form of a beam, and the reflectors and lamps are positioned and supported by a rigid member 13. It is obvious that I could control the beams by magnetically controlled shutters, or that a mechanical shutter could selectively control the beams.

There are also shown in Fig. 1 a plurality of light sensitive circuit elements as 27 and 28 which may be of any conventional type now known in the art, and enclosed if desired in a vacuous container as 29 and 30. The said elements in this particular embodiment are connected in multiple with a connection to a circuit including a source of power and an inductive element 41 forming the primary winding of a transformer 51. The circuit is connected to the said source of power 46 by leads 43 and 44 and double pole switch 42. The said source of power in this embodiment is a conventional direct current generator with commutator 46 driven by a shaft 47 from a power member of the train. The light sensitive element 27 is connected to this circuit through switch 32 by means of leads 35 and 36, and the element 28 is connected to the circuit through switch 31 by means of leads 33 and 34. A condenser 39 is also connected across the leads 37 and 38 when switch 42 is closed.

The secondary winding of transformer 51 is shown connected to switches 99 and 52 through leads 49 and 50. When these switches are closed to conductors 53 and 54 current is led to a current amplifying device which in this particular description may be designated as a uni-polar generator. It is within the scope of this invention however to employ any known form of current amplifying organization such as the well known electron tube system. Uni-polar generators are well known and a description of its operation is not considered necessary to those skilled in the art. The uni-polar generator has a rotor which may be considered as the rotating field member, and is preferably driven from the same shaft as the armature of direct current generator 46. The amplified current from the said uni-polar generator is delivered to busses 61 and 62 by conductors 57 and 58 connected to the stationary stator or armature of the said generator.

Connected to the busses by double pole switches 64, 65, and 66 are a plurality of selective circuits including impedance elements 67, 68, and 69, condensers 63 and 73, and relays 70, 71, and 72. When the said switches are closed the impedance 67 and relay 70 are in series. In a similar manner are impedance 68, condenser 63, and relay 71; and impedance 69 and relay 72 are in series parallel with condenser 73 connected to the terminal of impedance 69.

Each of these relays is provided with a circuit controlling armature associated with a circuit affecting element. For example, relay 70 has an armature 74 normally in circuit closing relation with contact element 75 due to the tension of spring 76. Relay 71 is equipped with an armature 77 normally in circuit closing relation with contact element 78 due to the pull of spring 79. Relay 72 is equipped with an armature 80 normally in circuit closing relation with contact element 81 due to the pull of spring 82. Relay 72 differs from relays 70 and 71 in that the armature 80 cannot be returned to a circuit closing position by the pull of the spring 82 unless the latch 83 has previously been rotated about the shaft 84 so as to release the armature portion 85 of the armature 80 from the lip of the said latch. It is evident that the other relays could have been so equipped.

There is also shown an indicator support 86 arranged to support and position an indicating means such as lamp R supplied with current through impedance coil 67 and lead 90, and connected to the bus 61 through conductor 91.

In addition there is shown by Fig. 1 a power control element 98 assumed for the sake of description to be a steam control valve. It is within the scope of this invention that the element 98 could be a power control element designed to control both the steam and air systems of a steam locomotive. In addition it could be considered as a control element of current and air systems of an electric locomotive. In general it is assumed to be a control element for any type of movable vehicle. This element 98 is assumed to be actuated to an operative or inoperative condition by means of the magnetic plunger 97. This plunger in turn is actuated by the presence or absence of current in the winding 96. For the sake of description the plunger in this particular embodiment is assumed to be held against pressure by the presence of current in the winding 96. In addition the valve 98 is assumed to close when the said current ceases to flow. The current for the winding 96 is obtained from the direct current commutator 46. It could of course be alternating current from any other suitable source. The circuit of which the winding 96 is a portion includes the leads 92 and 60 from the said direct current commutator 46. The lead 60 is connected to armature 74 of relay 70, and is continued by lead 93, armature 77, and contact 78, and lead 94 to armature 80 of relay 72. The circuit is completed by contact 81 and lead 95 to the winding 96.

In operation let it be assumed that the feeders 19, 20, 21, 22 are operatively connected to a signaling system to control the movements of vehicles such as railway trains. Let it also be assumed that the switches 23, 24, 25, and 26 are normally closed and that when the so-called "proceed" or green signal of the said signal system is in operation the lamps 3, 7, and 11 will be lighted; when the so-called "proceed with caution" or yellow signal is in operation that lamps 3, 5, 7, 9, and 11 will be lighted; and that when the so-called "stop" or red signal is in operation all the said lamps will be lighted. Now let it be assumed that all the other means shown on Fig. 1 are positioned on a movable vehicle, and that the light sensitive resistance changing element 27 is crossing the path of the beam of light from lamp 11 properly reflected by the action of the reflector 12. According to my invention a plurality of light sensitive elements may be employed. Accordingly a second light sensitive element 28 is so positioned on the said movable vehicle that the said element 28 intercepts the beam of lamp 3 at the same time that element 27 intercepts the beam of an additional lamp to the right as lamp 11. Lamp 11 is assumed to be the first of a second series of 8 lamps as 3-10. It is assumed that the elements are moving in a direction from left to right when facing the drawing. Hence the two elements 27 and 28 will together in effect intercept in sequence the beams of 16 lamps (all the lamps are assumed to be lighted except lamp 11) in the same consecutive manner that element 27 alone would have cut the beams of 16 consecutive lamps. By this arrangement I am able to reduce the number of lamps by one-half. It should be obvious that any number of elements such as 27 and 28 could be employed to cause a continuous passing of beams by the combined action of a sufficient number of the said elements. For example a light affected element could be placed on every car of the said train.

As the said element 27 has consecutively moved across the paths of the beams of light from lamps 3-10 its resistance has been changed according to the well known and accepted action of light affected resistance changing elements. A similar change of resistance will occur in the element 28 as the continued movement of the vehicle carries it across the beams of the said lights so that the said beams impinge on its active surface. Accordingly the current flowing in the circuit including the source of current 46, leads 43, 44, 37, and 38, switch 42, and primary transformer winding 41 will be changed in synchronism with the said change of resistance. If the lamps 3-10 are equally spaced and the movement of the said vehicle is uniform a uniformly changing or varying current will be caused to flow in the primary winding 41 of transformer 51. A condenser 39 is connected across leads 37 and 38 by means of switch 40 in order to sharpen the said variation. It should be noted that the switches 31, 32, 42, 52, 99, 100, 64, 65 and 66 have been shown in Fig. 1 in an open circuit position. It is obvious that various combinations of closed circuits will require certain of these switches to be normally in circuit closing position.

Therefore an alternating current in effect will be induced in the secondary winding 48 of transformer 51, and this current will be conducted to the current switches 99 and 52, and when the same are closed, to conductors 53 and 54. This alternating current will have a cycle for the passing of each beam by the elements 27 and 28. Hence the frequency of the said alternating current will depend on the spacing and number of lamps, and the speed of the train.

According to my invention I am able to selectively control the manner of lighting the lamps, either manually, or due to the selective control of the said signal system. Let it be assumed that the lamps are controlled by the said signal system. When the so called "proceed" signal of the said system is operative, lamps 3, 7, and (11) are assumed to be lighted, or some type of light source or light reflecting element similar to the said lamps is affected by energizing conductors 17 and 18. The speed of the train is assumed to be such that a frequency of (say) 40 beams per second will be crossed by the said element 27 or 28, or 27 and 28 together. Consequently a current with a frequency of 40 cycles per second will be delivered to the switches 99 and 52. When the so called "proceed with caution" signal is operative lamps 3, 5, 7, 9, and (11) are assumed to be lighted and with the train moving at the same speed as above described a total of 80 beams per second will be crossed by the said elements and therefore the current delivered to the switches 99 and 52 will have a frequency of 80 cycles per second. All the lamps are lighted when the so called "stop" signal is operative and assuming that the said train has not changed its speed a current with a frequency of 160 cycles will now be delivered to the switches 99 and 52. Hence my invention provides means to selectively produce a plurality of alternating current frequencies at a remote point by the action of a plurality of beams of light when permitted to impinge on the active surface of a light sensitive element.

Now let it be assumed that the speed of the said train is reduced to a speed of (say) 30 miles per hour from the previous speed of (say) 60 miles per hour. When the "proceed" signal is operative the current will have a frequency of ½ the number at the 60 mile rate or a frequency of 20 cycles per second. When the so called "caution" signal is operative the said current will have 40 cycles per second, and when the "stop" signal is in operation a frequency of 80 cycles per second. If the train is still further retarded to 15 miles per hour the frequencies of the said current will be as follows. For "proceed" 10 cycles; for "caution" 20 cycles; and for "stop" 40 cycles per second.

The relation may be more clearly defined by reference to the following table.

| Speed of vehicle | 60 | 30 | 15 | 0 |
|---|---|---|---|---|
| Cycles "proceed" | 40 | 20 | 10 | 0 |
| Cycles "caution" | 80 | 40 | 20 | 0 |
| Cycles "stop" | 160 | 80 | 40 | 0 |

It should be noted in passing, that the same frequency is generated under the following conditions; when train is moving 60 M. P. H. against a "proceed" signal, when moving 30 M. P. H. against a "caution" signal, and at 15 M. P. H. against a "stop" signal.

Hence there is delivered to the switches 99 and 52 an alternating current with a frequency proportional to the speed of the train, and the status of the said signal system.

When these switches 99 and 52 are closed the current is conducted to a current amplifying means by conductors 53 and 54. The current may be amplified by any of the known and accepted means, but I employ a unipolar generator in a new and novel way. The induced current from the secondary winding 48 is used as the exciting current for this generator, and consequently the generated current will have the same or a proportional frequency and will be of a greater strength. While this method of amplification would not be very efficient for complex currents such as voice currents, I find that an alternating current with an approximately uniform frequency may be successfully amplified by this form of generator.

This amplified current is conducted to the busses 61 and 62. Connected to these busses are a plurality of circuits including impedance elements, condensers, switches, and relays. Each circuit is assumed to be arranged to operate circuit contact devices when the said amplified current has a given frequency. This frequency may be different for each circuit, or it may be the same for all of the circuits. In some of these circuits the impedance coils, relay windings, and condensers are so connected that an alternating current of less than (say) 40 cycles cannot operatively flow to operate a given circuit contacting device. Other of the said circuits include an arrangement of the said elements whereby an alternating current of (say) more than 40 cycles cannot flow with sufficient strength to operate a circuit controlling device.

Hence I am able to operate selectively any one of the relay armatures 74, 77, and 80 by varying the number of lamps as 3 to 11 with the speed of the train remaining constant. I am also able to operate the said armatures selectively with a given number of lamps by varying the speed of the train. I am able to also indicate the status of the said signal system at a remote point due to these circuits. A lamp R shown mounted on the support 86 will be lighted when relay is operated. In order to simplify the circuit diagram lamps were omitted which could have been shown connected to the other relays.

I have shown the plurality of selective circuits largely for reference. It is evident that a large number of relays may be operated selectively, because the light sensitive element may be affected by as many as 40,000 beams per second without failing to change its resistance in synchronism with said light variation. No such frequency is required for the application of the invention to a train control system. There are other applications in which higher frequencies will be required and in which a plurality of selective relays will be required. Accordingly, I will describe the action of the relays when used in connection with a train control system, but it is obvious that the action is not so limited.

In this particular embodiment only one relay as 72 is really required. In passing it can be assumed that the circuit of which 72 is a portion is designed for comparatively high frequencies, and that the circuit of which relay 71 is a portion is arranged for comparatively low frequencies. The relay 70 is assumed to be in series with an impedance designed to permit current to flow sufficient to operate the said relay when the frequency is very low, or what would be considered a low frequency for the purpose of this description. All of the armatures 74, 77, and 80 are assumed to be normally closed or in contact due to the pull of the armature springs 76, 79, and 82. No description will be given of the selective operation of the relay armatures as the frequency of the current changes. It is omitted because the action in general is old and known in the art of telephony. Let it be assumed that relay 72 is used in the normal operation of the device, and that relay 71 is included to describe a modification of the said normal operation.

It should now be obvious that with the means as hereinbefore described, I can selectively operate any one of a plurality of circuit contactors from a remote point, this selection to be caused by the certain sequential interception of beams of light by a relatively moving light affected resistance changing circuit element.

It should be apparent that these circuit controlling elements can selectively be employed to control a supply of power to a plurality of power receivers, or vary the supply of power to a single receiver. Let it be assumed that the valve 98 is a portion of the steam supply system of a locomotive, altho it could also be a portion of the air brake system. This valve 98 is operated by moving the plunger 97 assumed to be a portion of a magnet actuated by a suitable current flowing in the winding 96, or by absence of such current. The power for this winding may be obtained from the direct current generator 46 when double pole switch 100 is closed to leads 92 and 60. The circuit is completed from lead 60 to the winding 96 by armature 74, contact 75, conductor 93, armature 77, contact 78, lead 94, armature 80, contact 81, and lead 95. When only relay 72 is used the lead 60 is connected directly to armature 80.

The circuit of which relay 72 is a portion is arranged to permit effective current to flow to the said relay when the current frequency is more than (say) 40 cycles per second. By referring to the above table, it will be noted that as long as less than (say) 40 beams per second are crossed the power control element 98 will not be affected. Hence as long as the train is moving at a speed indicated by the said signal system the power element will not be affected. Conversely as long as the train is moving faster than the speed indicated by the said signal system the power element 98 will be affected. The minimum speed of 15 miles per hour is used merely for description as any minimum speed may be obtained by varying the number of lamps. The description is not based on the idea of abruptly stopping the train, altho the relay 72 is provided with a latch 83 designed to hold the armature 85 away from the contact 81 until the latch 83 is manually or mechanically rotated about the axis 84 thereby to release the said armature. By this means the train will be brought to a stop unless the latch is operated.

Normally my embodiment will cause the train to move at "caution" speed when the "caution" signal is set, and to move at a speed of (say) 15 miles per hour when the "stop" signal is set.

If the train is moving at a "proceed" speed when the "caution" signal comes on, the increase in the number of beams as above described will raise the frequency of the current to operate relay 72. If now the power is affected by the operation of control element 98 the speed will be reduced to the "caution" speed. If now the train reaches the "caution" speed, and the "stop" signal comes on the frequency will again be increased above 40 cycles as above described. Relay 72 will again be affected to operate the power element to cause the speed of the said train to fall below a speed of 15 miles per hour, or such minimum speed as the circuit organization has been designed for. If the latch 83 is operative the train will be stopped until the armature 85 is released. In any combination of lamps and train speed the product must not be more than (say) 40 cycles per second if the relay 72 is to remain inoperative.

I would point out at this time that each car or element of the said train may be equipped with light susceptible elements such as 27 and 28. With a sufficient number of groups of lamps as 3 to 10 the action of passing beams would be continuous and the action of the relay 72 could be reversed. That is, the circuit of power control element 96 would be held closed due to continuous induced alternating current flowing through the relay winding, and opened on its absence. In this arrangement a failure of any portion of the system or of the lamps would stop the train. In addition the action as above described may be reversed, since a train may also be maintained above a certain speed by my system. I would point out that the relay 72 (or relay 71) may also be employed to lock and unlock distance controlling devices as well as control power elements. If the group of lamps were duplicated every 1000 feet, a distance device designed for (say) 1200 feet would be released every 1000 feet by the said relay. If a failure occurred in the system the train would be stopped 200 feet beyond the point of failure.

By closing switch 65 and opening switch 66 the relay 71 will become operative at frequencies below 40 cycles per second. Hence a train could be operated at very low speeds without otherwise changing the system, and thereby I provide a selective rate of control. This relay 71 is not held open by a latch as is relay 72 and hence the said train will not be abruptly stopped by its action. Relay 70 is designed to more or less act as a signal device, but it is shown as able to affect the said power element 96 by action of its armature 74 and contact 75. This relay may be used to indicate the presence of induced alternating current by the action of its contacts when the same are not in the power control circuit. However a signal lamp R is shown connected across its terminals so as to be lighted whenever certain frequencies are reached by the said induced current thereby to indicate at a remote point the condition of the said signal system.

In addition I would point out that my invention may be applied to any desired type of vehicle. For example, vehicles designed to operate on land, water, or in the air may be controlled by intercepting a plurality of beams of light in a desired consecutive sequence. Also according to my invention it is possible to intercept reflected light and thus permit a vehicle to be controlled by its own light projected on a plurality of reflectors. These reflectors may replace the lamps as 3 to 11 shown by Fig. 1. The lamps 3 to 11 in Fig. 1 may be replaced by reflectors mechanically or magnetically operated as a function of the said signal system. The source of light in this instance would be located on the locomotive of the said train.

While I have shown and described and have pointed out in the annexed claims, certain novel features of my invention, it will be understood that various omissions, substitutions and changes in the form and details of the device illustrated and in its operation may be made by those skilled in the art, without departing from the spirit of the invention.

Having thus described my invention, I claim :—

1. In a device of the class described, means forming a portion of a signal system and designed to produce a plurality of beams of light together constituting a speed control portion, light sensitive circuit means arranged to be moved across the paths of the beams to progressively intercept the said beams, means constituting a circuit organization including the said sensitive circuit means, a source of power, transformer windings, impedance elements, a plurality of circuit controlling relays, a variable frequency generator, and selective speed control means operatively connected to the above named means and designed to control the movement of the said circuit moving means according to the rate of the said interception.

2. In a vehicle control system, power means arranged to be selectively actuated by selective relays, a source of alternating current of selective frequencies associated with the said relays, means constituting the alternating current source and including a light sensitive resistance changing element, a source of current, and an inductive winding, means providing a plurality of rays of light positioned at a remote point relative to the said vehicle and designed to impinge on the active surface of the said light sensitive element as it is moved across the paths of the said beams thereby to vary its resistance at a desired rate and thus in effect produce the said alternating current, and means for selectively affecting the said light source.

3. In a light sensitive circuit organization, means constituting a light affected current changing element, means for positioning the said element in the paths of a plurality of beams of light in a desired sequence whereby the current flowing in the said light affected element will be varied in the same sequence, and inductive means operatively associated with the said light affected current changing means thereby in effect to change the said varying current into alternating current with a frequency proportional to the rate of the said desired sequence.

4. In a device of the class described, means constituting a light sensitive current varying element, means for moving the said element in the paths of a plurality of rays of light originating at a remote point, said element so moved as to consecutively intercept the said rays whereby a current flowing in the said element will be varied at the rate of the said consecutive interception, inductive means operatively associated with the said current varying means designed to change the said varying current into alternating current having a frequency proportional to the said consecutive interception, impedance elements operatively associated with the said inductive means designed to selectively permit certain of the said impedance elements to receive certain of the said alternating currents, power controlling means selectively operable by the said permitted currents, means constituting the source of the said light rays, means for supplying the said varied current, and means supplying the power current to the said power control means.

5. In a train control system, means constituting a light sensitive current varying element, means for moving the said element across the paths of a plurality of beams of light originating at a remote point, said element arranged to intercept the said rays in a desired sequence whereby a current flowing in the said element will be varied in synchronism with the said sequence, inductive means operatively associated with the said light sensitive current varying means to change the said periodically varying current into alternating current with a frequency proportional to the said rate of sequential interception, impedance elements operatively associated with the said inductive means certain of said impedance means designed to oppose certain of said alternating currents and to permit certain other alternating currents to selectively flow to power control elements thereby to selectively operate same and thus control the speed of the train, means constituting a source of power to actuate the said power control elements, means constituting a current amplifier and including a variable frequency uni-polar generator arranged to have its field excited by the said changed current, means constituting the source of the said rays, and means providing the current to be varied in the said sensitive element.

6. In a device of the class described, the combination of a plurality of beams of light, means for producing the said beams, a plurality of light affected circuit elements, sources of current, inductive means, current amplifying elements, impedance elements, means for co-operatively associating the above named means whereby the said power controlled beams of light will selectively control a second power control means due to the interception of the said beams by the said light affected elements, and means for controlling the said interception.

7. In a train control system, the combination of a plurality of light sources, a plurality of beams of light, a light susceptible circuit element, a plurality of current sources, a current amplifying organization, inductive elements, impedance elements, and a plurality of train control elements, means for operatively associating the above named means whereby the said train control elements are selectively controlled by the combined action of the beams of l'ght on the said susceptible element and the speed of the train, and means for selectively controlling the action of the said beams.

8. The combination of a light susceptible circuit element arranged to intercept in a desired sequence a plurality of reflected light rays together constituting a control means, means designed to selectively control the frequency of said interception, means constituting a source of current including the said light susceptible element, inductive means arranged to be affected by the said current when varied at the said interception frequency by the action of the said susceptible element, and means for amplifying the said varied current.

9. In a device of the class described, means providing a plurality of beams of light, means for selectively intercepting the said beams in a desired sequence constituting a light susceptible circuit organization, and means associated with the said circuit means designed to selectively control the speed of a vehicle proportional to the rate of the said interception.

10. In a train control system, means for selectively producing beams of light, means for intercepting the said beams at desired frequencies, said means constituting a light affected circuit organization movable relative to the said light producing means, means designed to amplify current converted at the said frequencies by the said system, means including a selective control circuit organization susceptible to certain of the said converted currents operatively connected to the said amplifying means, and power controlling means designed to be selectively operated by the said selective control circuit organization.

11. In a remote control system, a plurality of light sources, a plurality of light beams of constant intensity from the said sources, means for consecutively intercepting the said beams at selective frequencies and including a remotely positioned light sensitive circuit having a source of current, said circuit designed to have its status changed by a change in the frequency of the said consecutive interception, and indicator means operatively associated with the said circuit thereby to be selectively affected so as to indicate at a remote point the said frequency change.

12. In a speed control system, means for creating a plurality of constant light beams, movable means for successively intercepting a given number of the said beams at a rate determined by its movement, said means including a light sensitive resistance changing circuit element arranged to change its resistance thereby at the frequencies of the said intercepting rate, and means forming a selective control circuit system operatively associated with the said resistance changing element and designed to be selectively operated by alternating currents at the said frequencies.

13. In a remote controlled current amplifying system, the combination of a movable circuit organization including a light affected element, a source of current, and a transformer winding, means designed to project a plurality of beams of constant intensity light on the active surface of the said element in a desired consecutive order and at a frequency caused by the relative movement of the said circuit organization, said projection thereby varying the said current at the same consecutive order in the said transformer winding, and means constituting a second transformer winding whereby the said consecutive current variations will be transformed into an alternating current of the same consecutive alterations, and means constituting a current amplifier designed to generate a magnified current of a proportional frequency.

14. In a remote selectively controlled current convertor, the combination of a circuit organization including a light affected resistance changing element, a source of current, and a transformer winding, means providing and positioning a plurality of beams of light of approximately constant intensity whereby a relative movement of the said light affected element across the paths of the said beams in a desired consecutive sequence and frequency will vary the said current at the same sequence in the said transformer winding, and means constituting a second transformer winding inductively associated and movable with the first named winding whereby the said current variations will in effect become alternating current of a frequency depending on the said consecutive beam intercepting rate of the said element.

15. In selective remote train control device, means designed by its movement along a fixed path to intercept in succession at a desired rate at a remote point a plurality of beams of energy of approximately constant intensity, said means at said remote point designed to vary the status of a circuit organization when intercepting the said beams, and selective control means operatively connected to the said circuit and designed to be selectively affected by a change in the said desired rate of successive interception.

16. In a remote selective light controlled system, the combination of a light affected circuit element, a source of current, inductive windings, a current amplifier, impedance windings, switches, condensers, relays, a second source of current, and alternating current actuated selective control members, means for connecting the above named elements in a desired circuit organization, and means for progressively moving the said light controlled system relative to a plurality of beams of light constant intensity whereby the said light affected element will consecutively intercept the said beams thereby to selectively control the movement of the said system.

Signed at Detroit, in the county of Wayne and State of Michigan this 14th day of November A. D. 1927.

HOWARD J. MURRAY.